Aug. 29, 1961  E. DENZLER  2,998,506
SPOT WELDING MACHINE
Filed July 14, 1959
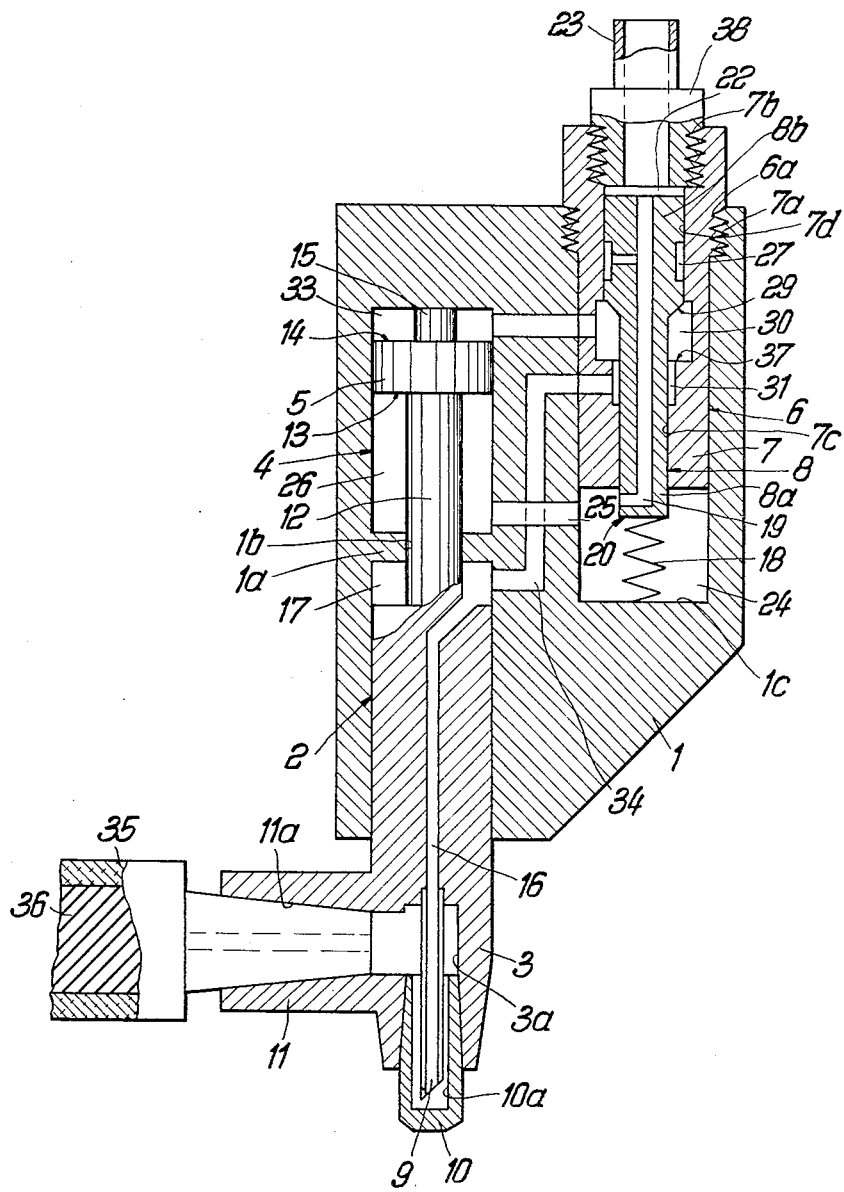
*Inventor:*
EMIL DENZLER
BY
Michael S. Striker
his ATTORNEY

United States Patent Office 2,998,506
Patented Aug. 29, 1961

2,998,506
SPOT WELDING MACHINE
Emil Denzler, Schlieren, Zurich, Switzerland, assignor to H. A. Schlatter A.G., Zollikon, Zurich, Switzerland
Filed July 14, 1959, Ser. No. 826,975
Claims priority, application Switzerland July 14, 1958
13 Claims. (Cl. 219—89)

The present invention relates to welding apparatus in general, and more particularly to a spot welding machine of the type comprising a series of electrode pairs wherein at least one electrode of each electrode pair is cooled by a liquid and is reciprocable by a hydraulic cylinder-piston assembly.

The presently known spot welding machines of such character invariably comprise two distinct supply conduits connected to each welding unit or head which latter includes a holder, a movable electrode and various control and actuating elements for the electrode, one of the supply conduits being utilized to deliver pressure medium for the working or forward stroke of the movable electrode, and the other conduit delivering pressure medium for the return stroke of the electrode into its idle or inoperative position. In addition, each such welding unit normally comprises a supply line for coolant, a line for leading the spent coolant away from the movable electrode, and an electric conductor for supplying welding current to the movable electrode. Such arrangement of multiple conduits and conductors considerably raises the cost of the spot welding machine, and also presents a serious problem when the machine is utilized for simultaneously forming a large number of welding spots, for example, when two or more parts are simultaneously joined by spot welding at 50, 100 or more points. It will be readily understood that a welding machine comprising say 100 movable electrodes, the same number of conductors, and 400 conduits occupies a comparatively large space which is of particular disadvantage if the welding spots should be applied very close to each other. In addition, the likelihood of breakdown, malfunction and leakage is greatly increased if the apparatus comprises a large number of conduits, electrical conductors, nipples, pipe unions, etc.

An important object of the present invention is to provide a welding unit comprising a movable electrode as well as actuating, cooling and current supplying means therefor which can operate with a greatly reduced number of conduits and conductors.

Another object of the invention is to provide a spot welding unit or head of the just outlined characteristics in which the conduit means for the actuating and cooling medium simultaneously conducts welding current to the movable electrode.

An additional object of the invention is to provide a spot welding unit which requires a single supply conduit and a single discharge conduit, and in which one of these conduits simultaneously conducts electric current to the movable electrode.

A further object of the present invention is to provide a very compact spot welding unit including a movable welding electrode which is particularly suitable for use in welding machines for forming a large number of closely adjacent welding spots.

A still further object of the invention is to provide a welding unit of the above described characteristics which is so constructed that the medium utilized for reciprocation of the movable electrode simultaneously serves as a coolant.

A yet further object of the instant invention is to provide a spot welding unit in which the speed at which the movable electrode is advanced into and returned from its operative position may be varied within any desired range.

Still another object of the present invention is to provide a welding unit of the above outlined character in which the quantity of coolant delivered to the movable electrode, too, may be varied within a very wide range.

A concomitant object of my invention is to provide a welding unit which comprises a comparatively small number of component parts, which requires little attention and servicing, and which is so constructed that the cooling fluid simultaneously cools not only the movable electrode but also all other components of the supporting and reciprocating means therefor.

With the above objects in view, the invention resides essentially in the provision of a unit for supporting one of an electrode pair in projection- or other types of multiple-spot welding machines, the welding unit comprising a single supply conduit for a pressure medium which latter serves as a means for reciprocating the plunger of the double acting hydraulic cylinder-piston assembly to which the movable electrode is connected, and also as a means for cooling the movable electrode. A single discharge conduit is provided for receiving and leading away the spent coolant, this discharge conduit preferably at the same time performing the function of a conductor for supplying welding current to the movable electrode. Before reaching the aforementioned cylinder-piston assembly, the pressure medium or coolant is caused to pass through and to actuate the control means for the reciprocable plunger to which the movable electrode is connected. The novel system further comprises means for delivering coolant at variable pressures so as to actuate the control means in a given working rhythm and to thus determine the speed at which the electrode is moved into operative or idle position.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, the single figure of which is a longitudinal section through one unit of a multiple-spot welding machine, the welding unit or head comprising a movable electrode and actuating, cooling and current supplying means therefor.

Referring now in greater detail to the drawing, there is shown a housing or casing 1 formed with a first bore 2 which reciprocably receives an electrode holder 3, with an aligned second bore 4 which defines a cylinder space for the hydraulic piston or plunger 5, and with a third bore 6 which is shown as but need not necessarily be axially parallel with the bores 2 and 4. The bore 6 houses the control means for the double acting cylinder-piston assembly 4, 5, these control means comprising a cylindrical sleeve 7, a piston 8, and a resilient member here shown as a helical spring 18.

The holder 3 carries at its end which is distant from the housing 1 a hollow electrode 10 into whose blind bore 10a extends the free end of an open tube 9, the latter's function being to deliver coolant into the electrode 10, and the coolant simultaneously serving as a means for reciprocating the electrode holder 3 in the bore 2. The holding means 3 is formed with or connected to a radial pipe connection or nipple 11, and is reciprocable by a piston rod 12 which latter extends upwardly through a passage 1b formed in the partition 1a between the aligned bores 2, 4 and is connected to the plunger 5. The plunger divides the cylinder space or bore 4 into a lower cylinder space 26 and an upper cylinder space 33. The area of the surface 13 on the plunger 5 which is turned toward the cylinder space 26 corresponds to the plunger's cross-sectional area minus the cross-sectional area of the piston rod 12. The other plunger and surface 14 is larger than the end surface 13 and faces the cylinder space 33. To prevent the plunger 5 from moving all the way to the upper end wall of cylinder space 33, there is provided an abutment or stop 15 whose diameter is smaller than that of the piston rod 12; this stop 15 may be connected either to the upper end wall of cylinder space 33 or preferably to the end surface 14 of plunger 5.

The interior of coolant-delivering tube 9 communicates with a coaxial passage or channel 16 formed in the electrode holder 3, and the upper end of passage 16, in turn, communicates with a chamber 17 formed by the bore 2 above the upper end of the electrode holder 3. This chamber 17 is bounded by the upper end face of holder 3, by the underside of partition 1a, by that portion of housing 1 which surrounds the upper end of bore 2 therein, and by the periphery of piston rod 12. The open lower end of cooling tube 9 communicates with the bore 10a in movable electrode 10, with an enlarged chamber 3a in the holder 3, and through the latter with the conical bore 11a in the nipple 11.

As before stated, the control assembly for the delivery of coolant into the interior or bore 10a in the reciprocable electrode 10 is installed in the bore 6 and consists of a cylindrical sleeve 7, of a piston 8 which is reciprocably received in the sleeve 7, and of a coiled expansion spring 18. This control assembly simultaneously acts as a means for regulating the reciprocatory movements of electrode holder 3 and plunger 5 in bores 2, 4, respectively. A portion of the periphery of the cylinder 7 is externally threaded, as at 7a, and meshes with the tapped zone 6a of the bore 6 in housing means 1. The upper end of hollow sleeve 7 is internally threaded, as at 7b, and meshes with external threads 38a on a hollow nipple or pipe coupling 38. The piston 8 is formed with an axial passage 19 and is constantly biased by spring 18 into the position in which it is shown in the drawing. This spring operates between the lower end face 20 of the piston 8 and the lower end wall 1c in the pressure chamber 24 formed by the bore 6 below the lower end of cylinder 7. The area of upper end face 21 of the piston 8 is larger than that of the lower end face 20, and the upper end face 21 defines with the lower end face of nipple 38 a pressure chamber 22 occupying the uppermost zone of bore 6. The chamber 22 communicates with the discharge end of a supply conduit 23 which is connected to the nipple 38. The source and means for delivering a cooled liquid medium at varying pressures into the conduit 23 and into chamber 22 are not shown in the drawing. Such means may comprise a tank and a hydraulic pump capable of delivering fluid at variable pressures, or any equivalent structure.

The lower chamber 24 in the bore 6 below the cylindrical sleeve 7 communicates with the cylinder space 26 in bore 4 through a channel 25.

The piston 8 comprises a lower portion 8a of smaller diameter and an upper portion 8b of larger diameter which latter is separated from piston portion 8a by a conical surface 29. The cylinder 7 is formed with a lower bore 7c slidably receiving the piston portion 8a, and with an upper bore 7d which slidably receives the other piston portion 8b. The latter defines in its periphery an annular groove 27 which communicates with the axial bore 19 through a radial connecting passage 28. In the position of piston 8 as shown in the drawing, the annular groove 27 and the passage 28 are sealed by that wall of cylinder 7 which surrounds the bore 7d therein. The lower end of bore 7d in the cylinder 7 is expanded into an annular recess 30 of comparatively large diameter, and the upper end of bore 7c is expanded into an annular recess 31 whose diameter is smaller than that of recess 30 and also smaller than the maximum diameter of the conical surface 29 between the different-diameter portions 8a, 8b of piston member 8. As shown, the recesses 30, 31 communicate with each other and define therebetween an annular shoulder 37. The recess 30 communicates with the upper cylinder space 33 in bore 4 of housing 1 through a connecting passage or channel 32, and a further channel 34 connects the recess 31 with the chamber 17 at the upper end of bore 2.

The bore 11a of nipple 11 near the lower end of electrode holder 3 receives the suitably shaped end of a flexible discharge conduit or hose 35, the latter comprising a tubular layer 36 of metallic netting which is electrically connected to the nipple 11 and also to one pole of the non-represented source of welding current for the electrode 10. As is well known, the other pole of the current source is connected to the non-represented second or counter electrode of the welding machine. The netting 36 may be replaced by a stranded conductor cable or by a series of individual untwisted conductors.

It will be seen that the illustrated spot welding unit comprises only a single supply conduit 23 and a single discharge conduit 35, and also that one of these conduits simultaneously serves as a means for delivering welding current to the cooled movable electrode 10. In addition, the liquid medium delivered at requisite pressures through the supply conduit 23 simultaneously serves as a coolant for the movable electrode as well as a means for reciprocating the electrode holder 3.

The operation of the welding unit is as follows:

The drawing shows the electrode 10 in idle or non-operative position. The cooling liquid delivered through the supply conduit 23 at a comparatively low pressure fills the chamber 22 above the upper end face 21 of piston 8, the axial bore 19 in the latter, the lower chamber 24 below the cylinder 7, the passage 25, and the cylinder space 26 below the plunger 5. The pressure of fluid is selected in such a way that it maintains the plunger 5 and hence the holder 3 with movable electrode 10 in raised position, but is insufficient to overcome the force of resilient means 18 in order to move the piston 8 in downward direction toward the end wall 1c in pressure chamber 24.

If the liquid pressure in conduit 23 increases to such an extent that the resultant of forces acting against the piston end faces 20, 21 causes downward displacement of piston 8 against the action of coil spring 18, the conical surface 29 of piston 8 moves into abutment with the internal shoulder 37 in the bore of cylinder 7 and seals the recess 30 from the smaller-diameter recess 31. In such position of the piston 8, the latter's annular groove 27 communicates with the recess 30 and the coolant is free to flow from the bore 19 through the radial passage 28, through the groove 27, recess 30 and passage 32 into the cylinder space 33, as well as through the open lower end of bore 19, the chamber 24 and passage 25 into the lower cylinder space 26. Thus, the fluid pressures prevailing at the opposing sides of plunger 5 are identical; however, since the area of the surface 14 is larger than the area of the surface 13, the plunger 5 is caused to perform a downward stroke and moves the electrode 10 into welding position, i.e., into contact with the non-represented workpiece. The speed at which the plunger 5 performs its working stroke depends upon the pressure of liquid in the supply conduit 23; upon the difference in the areas of surfaces 13, 14; upon the inertia of parts 3, 5, 10, 11 and 12; as well as upon the resistance met by the liquid while flowing through the channels or passages 19, 25, 28 and 32. Since particularly the resistance to flow of coolant may be readily varied in many known and comparatively simple ways, the speed at which the electrode 10 is advanced into operative position may be readily adjusted to optimum operating conditions. In the operative position of the movable electrode 10, the conductor 36 delivers current to the welding spot and the welding operation takes place in the well known manner.

When the welding operation is completed, the pressure of fluid in supply conduit 23 is reduced sufficiently to permit a movement of the piston 8 into the illustrated position under the influence of expanding coil spring 18. The annular groove 27 then moves into the bore 7d and the cylinder space 33 is shut off from the supply conduit 23. However, fluid pressure prevails in the lower cylinder space 26 and, consequently, the plunger 5 is moved in upward direction to the extent permitted by the stop 15, i.e., into the position which is shown in the drawing. As the plunger 5 performs its upward or return stroke to withdraw the holder 3 into the latter's bore 2, liquid coolant is expelled from the cylinder space 33 and advances through the passage 32, recesses 30, 31, channel 34, chamber 17, passage 16, and cooling tube 9 into the bore 10a of movable electrode 10 whereby the latter is cooled sufficiently for the next welding operation. Spent fluid is free to advance through the chamber 3a in holder 3 and through the bore 11a of nipple 11 into the flexible discharge conduit 35.

It will be seen that the volume of cylinder space 33 determines the quantity of coolant delivered into the bore 10a of electrode 10 during each return stroke of the plunger 5. If the quantity of fluid discharged from cylinder space 33 is insufficient for effective cooling of the electrode 10, additional coolant may be delivered into the bore 10a in a number of different ways. For example, the chamber 22 at the upper end of piston 8 may be connected with the passage 16 in holder 3 by way of a non-represented bypass channel which may be formed in the housing 1. Alternately, an axially parallel passage may be provided in the plunger 5 to connect the upper cylinder space 33 with the lower cylinder space 26, or the plunger 5 may be formed with one or more axially parallel peripheral grooves which then connect the spaces 26, 33 with each other. Still further, one or more grooves may be formed in the wall surrounding the bore 4 in housing 1, such groove or grooves again constituting means for communicatively connecting the chamber 26 with the upper chamber 33. It is equally possible to slightly reduce the diameter of double acting plunger 5 so as to form an annular clearance or gap between the chambers 26 and 33. Additional liquid coolant may also be supplied into the electrode 10 by forming one or more axially parallel grooves in the walls of cylinder 7 which surround the latter's bore 7c and/or 7d, or in the peripheral zone of piston portion 8a and/or 8b. Still further, the piston 8 may be of such diameter as to define an annular clearance with the wall surrounding the cylinder bore 7c and/or 7d. Finally, the same result may be attained by providing one or more radial bores in the cylinder 7 to connect the recess 30 and/or 31 with the axial bore 19 of piston 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, and, therefore, such adaptations should and are intended to be comprehended within the meaning and range of equivalence of the following claims.

What is claimed as new and desired to be secured by Letters Patent is:

1. In a spot welding machine, a welding unit comprising, in combination, a housing; a hollow electrode; double acting cylinder and piston means in said housing connected with said electrode for reciprocating the same between an operative and an idle position; a supply conduit connected to said housing for delivering coolant to said electrode, the housing defining channel means for conveying coolant into said electrode through said cylinder and piston means whereby the coolant simultaneously causes the latter to reciprocate the electrode between said positions; and means for controlling the operation of said cylinder and piston means, said controlling means mounted in said channel means between said conduit and said cylinder and piston means.

2. In a spot welding machine, a welding unit comprising, in combination, a housing difining a cylinder; a double acting plunger having a pair of end surfaces of different areas and reciprocably installed in said cylinder for dividing the latter into a pair of cylinder spaces; a hollow electrode connected to said plunger for reciprocatory movements between an operative and an idle position; a supply conduit connected to said housing for delivering a liquid at varying pressures, said housing defining channel means connecting the supply conduit with both said cylinder spaces and further connecting one of said cylinder spaces with the interior of said electrode; and control means in said channel means for permitting the flow of liquid into said cylinder spaces and for sealing said one cylinder space from the interior of said electrode in response to a first pressure of liquid whereby the plunger moves the electrode into operative position, and for sealing said one cylinder space from the supply conduit and for opening the channel means between said one cylinder space and the interior of said electrode in response to a second pressure of liquid whereby the plunger moves said electrode into idle position and the liquid in said one cylinder space flows into the interior of and cools said electrode.

3. In a spot welding machine, a welding unit comprising, in combination, a housing defining a cylinder; a double acting plunger having a pair of end surfaces of different areas and reciprocably installed in said cylinder for dividing the latter into a pair of cylinder spaces; a hollow electrode connected to said plunger for reciprocatory movements between an operative and an idle position; a supply conduit connected to said housing for delivering a liquid at varying pressures, said housing defining channel means connecting the supply conduit with both said cylinder spaces and further connecting one of said cylinder spaces with the interior of said electrode; a discharge conduit movable with and communicating with the interior of said electrode; and control means in said channel means for permitting the flow of liquid into said cylinder spaces and for sealing said one cylinder space from the interior of said electrode in response to a first pressure of liquid whereby the plunger moves the electrode into operative position, and for sealing said one cylinder space from the supply conduit and for opening the channel means between said one cylinder space and the interior of said electrode in response to a second pressure of liquid whereby the plunger moves said electrode into idle position and the liquid in said one cylinder space flows into the interior of and cools said electrode, and is led away through said discharge conduit.

4. In a spot welding machine, a welding unit comprising, in combination, a housing defining a cylinder; a double acting plunger in said cylinder having end surfaces of different areas and dividing the cylinder into a pair of cylinder spaces; a hollow electrode connected to and reciprocable by the plunger between an operative and an idle position; a supply conduit connected to the housing for delivering a liquid at varying pressures, said housing difining a bore communicating with the supply conduit, first channel means between said bore and each of said cylinder spaces, and second channel means for connecting one of said cylinder spaces with the interior of said electrode through said bore; a discharge conduit communicating with the interior of said electrode; and spring biased means in said bore responsive to varying pressures of liquid for controlling the latter's flow into said channel means, the liquid at one given pressure moving the control means into a position in which the bore communicates with both said cylinder spaces and is sealed from the interior of said electrode whereby the plunger moves said electrode into operative position, and the liquid at another given pressure permitting movement of the control means into a position in which the one cylinder space communicates with the second channel means whereby the plunger moves said electrode into idle position and the liquid flows from the one cylinder space into said second channel means to cool the electrode and is led away through said discharge conduit.

5. In a spot welding machine, a welding unit comprising, in combination, a housing defining a first bore and a second bore; a double acting plunger having a pair of end surfaces of different areas and reciprocably installed in the first bore for dividing the latter into a pair of cylinder spaces; a hollow electrode connected to and reciprocable by the plunger between an operative and an idle position; a discharge conduit having an end movable with and communicating with the interior of said electrode; a supply conduit communicating with the second bore of said housing for delivering a liquid at varying pressures, the housing defining first channel means between the second bore and one of said cylinder spaces adjacent to the larger end surface of said plunger, second channel means between the second bore and the other cylinder space, and third channel means between the second bore and the interior of said electrode; and control means in the second bore for sealing the supply conduit from said third channel means in response to one given pressure of liquid whereby the liquid flows into both said cylinder spaces and the plunger moves said electrode into operative position, and for sealing the first channel means from the supply conduit while simultaneously connecting the first and third channel means in response to another given pressure of liquid whereby the liquid flows into the other cylinder space and the plunger moves the electrode into idle position, the liquid in said one cylinder space flowing through said first and third channel means into and cooling said electrode, and being led away through said discharge conduit.

6. In a spot welding machine, a welding unit comprising, in combination, a housing defining a first bore and a second bore; a double acting plunger having a pair of end surfaces of different areas and reciprocably installed in the first bore for dividing the latter into a pair of cylinder spaces; a hollow electrode connected to and reciprocable by the plunger between an operative and an idle position; a discharge conduit having an end movable with and communicating with the interior of said electrode; a supply conduit communicating with the second bore of said housing for delivering a liquid at varying pressures, the housing defining first channel means between the second bore and one of said cylinder spaces adjacent to the larger end surface of said plunger, second channel means between the second bore and the other cylinder space, and third channel means between the second bore and the interior of said electrode; and control means in said second bore, said control means comprising a cylindrical sleeve having a first and a second internal recess communicating with each other and with said first and third channel means, respectively, a piston reciprocable in said sleeve and having a bore through which said supply conduit communicates with said second channel means, an annular groove and a passage connecting the groove with said last mentioned bore, and resilient means for constantly urging the piston into a position in which said groove is sealed from the first recess and the latter communicates with the second recess whereby the liquid flows through the bore of said piston and through the second channel means into the other cylinder space and the plunger moves the electrode into idle position while the liquid contained in the one cylinder space flows through said first channel means into said first and second recesses and through the third channel means into the electrode to cool the same and is led away through said discharge conduit, and the piston being moveable by the liquid discharged by said supply conduit at a pressure sufficient to overcome the force of said resilient means into a second position in which it seals the first recess from the second recess and said groove communicates with the first recess, the liquid then flowing through said passage and said groove into the first recess and through the first channel means into said one cylindrical space, and through the bore of said piston and through the second channel means into the other cylinder space whereby the plunger moves said electrode into operative position.

7. In a spot welding machine, a welding unit comprising, in combination, a housing defining a first bore and a second bore; a double acting plunger having a pair of end surfaces of different areas and reciprocably installed in the first bore for dividing the latter into a pair of cylinder spaces; a hollow electrode connected to and reciprocable by the plunger between an operative and an idle position; a discharge conduit having an end movable with and communicating with the interior of said electrode; a supply conduit communicating with the second bore of said housing for delivering a liquid at varying pressures, the housing defining first channel means between the second bore and one of said cylinder spaces adjacent to the larger end surface of said plunger, second channel means between the second bore and the other cylinder space, and third channel means between the second bore and the interior of said electrode; and control means in said second bore, said control means comprising a cylindrical sleeve rigidly fixed to said housing and connected with said supply conduit, said sleeve having an axial bore comprising a portion of larger diameter adjacent to said supply conduit and a portion of smaller diameter, a first recess communicating with the bore portion of larger diameter and with said first channel means, and a second recess communicating with the bore portion of smaller diameter as well as with the first recess and with said third channel means, said recesses definiing therebetween an annular shoulder, a piston having a first portion slidably received in the larger diameter bore portion of said sleeve, a second portion slidably received in the smaller diameter bore portion of said sleeve, an axial bore, a peripheral groove in said first portion, and a radial passage between said groove and said axial bore, the axial bore of said piston communicating with said supply conduit and with said second channel means, and the piston further comprising a conical surface between said portions, said conical surface of such diameter that it abuts said shoulder and seals the first recess from the second recess when the piston is moved in the sleeve in a direction away from the supply conduit, and resilient means in said second bore for constantly biasing the piston in a direction toward the supply conduit whereby the conical surface is moved away from said shoulder and said groove is received in the larger diameter bore portion of said sleeve, the liquid then flowing through the axial bore of said piston and through the second channel means into the other cylinder space and the plunger moving the electrode into idle position while the liquid in said one cylinder space flows through the first channel means, through the first and second recess and into the third channel means to flow into and to cool the electrode and to be led away through said discharge conduit, and the piston being movable by the liquid at a pressure sufficient to overcome the force of said resilient means into a position in which the groove communicates with the first recess and the conical surface abuts the shoulder to seal the first recess from the second recess whereby the liquid flows through the axial bore of said piston, through said passage and said groove into the first recess and thereupon through the first channel means into said one cylinder space, and through the axial bore of said piston through the second channel means into the other cylinder space and the plunger moves the electrode into operative position.

8. In a spot welding machine, a welding unit comprising, in combination, a housing defining a first bore and a second bore; a double acting plunger having a pair of end surfaces of different areas and reciprocably installed in the first bore for dividing the latter into a pair of cylinder spaces; a hollow electrode connected to and reciprocable by the plunger between an operative and an idle position; a discharge conduit having an end movable with and communicating with the interior of said electrode; a supply conduit communicating with the second bore of said housing for delivering a liquid at varying pressures, the housing defining first channel means between the second bore and one of said cylinder spaces adjacent to the larger end surface of said plunger, second channel means between the second bore and the other cylinder space, third channel means between the second bore and the interior of said electrode, and fourth channel means for connecting said one cylinder space with the other cylinder space; and control means in the second bore for sealing the supply conduit from said third channel means in response to one given pressure of liquid whereby the liquid flows into both said cylinder spaces and the plunger moves said electrode into operative position, and for sealing the first channel means from the supply conduit while simultaneously connecting the first and third channel means in response to another given pressure of liquid whereby the liquid flows into the other cylinder space and the plunger moves the electrode into idle position, the liquid in said one cylinder space flowing through said first and third channel means into and cooling said electrode, and being led away through said discharge conduit.

9. In a spot welding machine, a welding unit comprising, in combination, a housing defining a first bore and a second bore; a double acting plunger having a pair of end surfaces of different areas and reciprocably installed in the first bore for dividing the latter into a pair of cylinder spaces; a hollow electrode connected to and reciprocable by the plunger between an operative and an idle position; a discharge conduit having an end movable with and communicating with the interior of said electrode; a supply conduit communicating with the second bore of said housing for delivering a liquid at varying pressures, the housing defining first channel means between the second bore and one of said cylinder spaces adjacent the larger end surface of said plunger, second channel means between the second bore and the other cylinder space, third channel means between the second bore and the interior of said electrode, and fourth channel means for permanently connecting the supply conduit with the interior of said electrode; and control means in the second bore for sealing the supply conduit from said third channel means in response to one given pressure of liquid whereby the liquid flows into both said cylinder spaces and the plunger moves said electrode into operative position, and for sealing the first channel means from the supply conduit while simultaneously connecting the first and third channel means in response to another given pressure of liquid whereby the liquid flows into the other cylinder space and the plunger moves the electrode into idle position, the liquid in said one cylinder space flowing through said first and third channel means into and cooling said electrode, and being led away through said discharge conduit.

10. In a spot welding machine, a welding unit comprising, in combination, a housing; a hollow electrode; double acting cylinder and piston means in said housing connected with said electrode for reciprocating the same between an operative and an idle position; a supply conduit connected to said housing for delivering coolant to said electrode, the housing defining channel means for conveying coolant into said electrode through said cylinder and piston means whereby the coolant simultaneously causes the latter to reciprocate the electrode between said positions; a discharge conduit communicating with the interior of said electrode for leading away spent coolant therefrom, said discharge conduit constituting conductor means for supplying welding current to said electrode; and means for controlling the operation of said cylinder and piston means, said controlling means mounted in said channel means between said conduit and said cylinder and piston means.

11. In a spot welding machine, a welding unit comprising in combination, a housing defining a cylinder; a double acting plunger having a pair of end surfaces of different areas and reciprocably installed in said cylinder for dividing the latter into a pair of cylinder spaces; a hollow electrode connected to said plunger for reciprocatory movements between an operative and an idle position; a supply conduit connected to said housing for delivering a liquid at varying pressures, said housing defining channel means connecting the supply conduit with both said cylinder spaces and further connecting one of said cylinder spaces with the interior of said electrode; a discharge conduit communicating with the interior of said electrode, said discharge conduit comprising at least one conductor electrically connected with said electrode for supplying welding current thereto; and control means in said channel means for permitting the flow of liquid into said cylinder spaces and for sealing said one cylinder space from the interior of said electrode in response to a first pressure of liquid whereby the plunger moves the electrode into operative position, and for sealing said one cylinder space from the supply conduit and for opening the channel means between said one cylinder space and the interior of said electrode in response to a second pressure of liquid whereby the plunger moves said electrode into idle position and the liquid in said one cylinder space flows into the interior of and cools said electrode, and is led away through said discharge conduit.

12. In a spot welding machine, a welding unit comprising, in combination, a housing defining a first bore, a second bore aligned with said first bore, and a third bore; a double acting plunger having a pair of end surfaces of different areas and reciprocably received in the first bore for dividing the latter into a pair of cylinder spaces; a piston rod connected to the plunger and extending into said second bore; an electrode holder connected to said piston rod and reciprocably received in said second bore, said holder having a passage communicating with said second bore; a hollow electrode connected to said holder in such manner that its interior communicates with said passage; a discharge conduit having an end connected to said holder and communicating with the interior of said electrode, said discharge conduit comprising at least one conductor electrically connected and adapted to supply welding current to said electrode; a supply conduit communicating with the third bore for delivering thereto liquid at variable pressures, the housing defining first channel means connecting one of the cylinder spaces adjacent to the larger end surface of the plunger with said third bore, second channel means connecting the other cylinder space with the third bore, and third channel means connecting the third bore with the second bore and through the passage in said holder with the interior of said electrode; and control means in the third bore for sealing the supply conduit from said third channel means in response to one given pressure of liquid whereby the liquid flows into both said cylinder spaces and the plunger moves said electrode into operative position, and for sealing the first channel means from the supply conduit while simultaneously connecting the first and third channel means in response to another given pressure of liquid whereby the liquid flows into the other cylinder space and the plunger moves the electrode into idle position, the liquid in said one cylinder space flowing through said first and third channel means into the second bore and through the passage of said holder into the electrode to cool the same, the spent liquid being led away from the electrode through said discharge conduit.

13. In a spot welding machine, welding unit comprising, in combination, a housing defining a first bore, a second bore aligned with said first bore, and a third bore; a double acting plunger having a pair of end surfaces of different areas and reciprocably received in the first bore for dividing the latter into a pair of cylinder spaces; stop means in the one cylinder space adjacent to the larger end surface of said plunger for limiting the latter's movement in a direction to reduce the volume of said one cylinder space; a piston rod connected to the plunger and extending into said second bore; an electrode holder connected to said piston rod and reciprocally received in said second bore, said holder having a passage communicating with said second bore; a hollow electrode connected to said holder in such manner that its interior communicates with said passage; a discharge conduit having an end connected to said holder and communicating with the interior of said electrode, said discharge conduit comprising at least one conductor electrically connected and adapted to supply welding current to said electrode; a supply conduit communicating with the third bore for delivering thereto liquid at variable pressures, the housing defining first channel means connecting said one cylinder space with said third bore, second channel means connecting the other cylinder space with the third bore, and third channel means connecting the third bore with the second bore and through the passage in said holder with the interior of said electrode; and control means in the third bore for sealing the supply conduit from said third channel means in response to one given pressure of liquid whereby the liquid flows into both said cylinder spaces and the plunger moves said electrode into operative position, and for sealing the first channel means from the supply conduit while simultaneously connecting the first and third channel means in response to another given pressure of liquid whereby the liquid flows into the other cylinder space and the plunger moves the electrode into idle position, the liquid in said one cylinder space flowing through said first and third channel means into the second bore and through the passage of said holder into the electrode to cool the same, the spent liquid being led away from the electrode through said discharge conduit.

References Cited in the file of this patent

UNITED STATES PATENTS

| | | |
|---|---|---|
| 2,063,258 | Martin | Dec. 8, 1936 |
| 2,514,747 | Daniels | July 11, 1950 |
| 2,714,150 | Kaiser | July 26, 1955 |
| 2,975,264 | Fetz | Mar. 14, 1961 |